United States Patent [19]
Glynn et al.

[11] 3,828,261
[45] Aug. 6, 1974

[54] SOLID STATE COMPASS FOLLOWER

[75] Inventors: Donald C. Glynn, West Lake Village; Andrew M. Chao, Monterey Park; George E. Carter, Panorama City, all of Calif.

[73] Assignee: The Bendix Corporation, Teterboro, N.J.

[22] Filed: Dec. 29, 1972

[21] Appl. No.: 319,424

[52] U.S. Cl. .............................................. 328/155
[51] Int. Cl. ........................................... H03b 3/04
[58] Field of Search ................. 328/155, 109, 133; 330/107; 307/232

[56] References Cited
UNITED STATES PATENTS

| | | | |
|---|---|---|---|
| 3,163,823 | 12/1964 | Kellis | 328/155 |
| 3,181,122 | 4/1965 | Brown | 328/155 |
| 3,199,037 | 8/1965 | Graves | 328/155 |
| 3,286,188 | 11/1966 | Castellano | 328/155 |
| 3,577,088 | 5/1971 | Goggins | 328/155 |
| 3,614,635 | 10/1971 | LaPine | 328/155 |
| 3,667,031 | 5/1972 | Cox | 328/155 |
| 3,685,043 | 8/1972 | Kosakowski | 328/155 |
| 3,701,953 | 10/1972 | Lubarsky | 328/155 |

Primary Examiner—John S. Heyman
Assistant Examiner—Ro E. Hart
Attorney, Agent, or Firm—Anthony F. Cuoco; S. H. Hartz

[57] ABSTRACT

In a compass display system, a compass follower for insuring that true north is always at the top of the display. Solid state equipment is provided for correlating the compass outputs with a reference signal and for operating on the correlated output in a phase locked loop. An auxiliary loop is provided in which the compass follower output is phase locked to an external reference to render said output independent of compass excitation.

5 Claims, 2 Drawing Figures

SOLID STATE COMPASS FOLLOWER

BACKGROUND OF THE INVENTION

1. Field of the Invention

This invention relates generally to compass display systems and particularly to systems of the type described wherein true north is always at the top of the display. More particularly, this invention relates to a compass follower for accomplishing the aforenoted with increased reliability and with a smaller package than has heretofore been the case.

2. Description of the Prior Art

Dipped sonar systems employ tranducers, flux gate* (*Registered trademark of the Bendix Corporation.) compass devices and cathode ray tubes (CRT) for display purposes. It is necessary in such systems to compensate for transducer spin in the water so that true north is always displayed at the top of the CRT. Prior to the present invention this has been accomplished by electromechanical servo systems whereby the signals applied to the horizontal and vertical deflection parts of the CRT are rotated through an appropriate angle by, for example, a motor driven resolver. Apparatus of this type has less than desired reliability and consumes valuable space and weight. The present invention provides means which may be solid state implemented for accomplishing the intended purpose with increased reliability and with a smaller package than has heretofore been the case.

SUMMARY OF THE INVENTION

This invention contemplates a compass follower used with a flux gage compass display system for insuring that true north is always at the top of the display. The flux gate is excited by a 400 cycle source and provides three 800 cycle vector spikes. Each of the spikes is multiplied by a respective phase shifted reference signal and the multiplied signals are summed. The summed signal is operated on in a phase locked loop so that the phase angle equals the desired variation from magnetic north. The spikes are summed and the summed spike is operated on in an auxiliary loop so as to be phase locked to an external reference whereby the compass follower nulls to the desired compass heading independent of compass excitation.

The main object of this invention is to provide a compass display system including a compass follower for insuring that true north is always at the top of the display.

Another object of this invention is to provide a device of the type described wherein the compass outputs are correlated with a reference signal and the correlated output is operated on in a phase locked loop.

Another object of this invention is to provide an auxiliary loop which phase locks the compass follower output to an external reference for rendering said output independent of compass excitation.

Another object of this invention is to accomplish the above with solid state equipment thereby eliminating electromechanical equipment heretofore known in the art.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
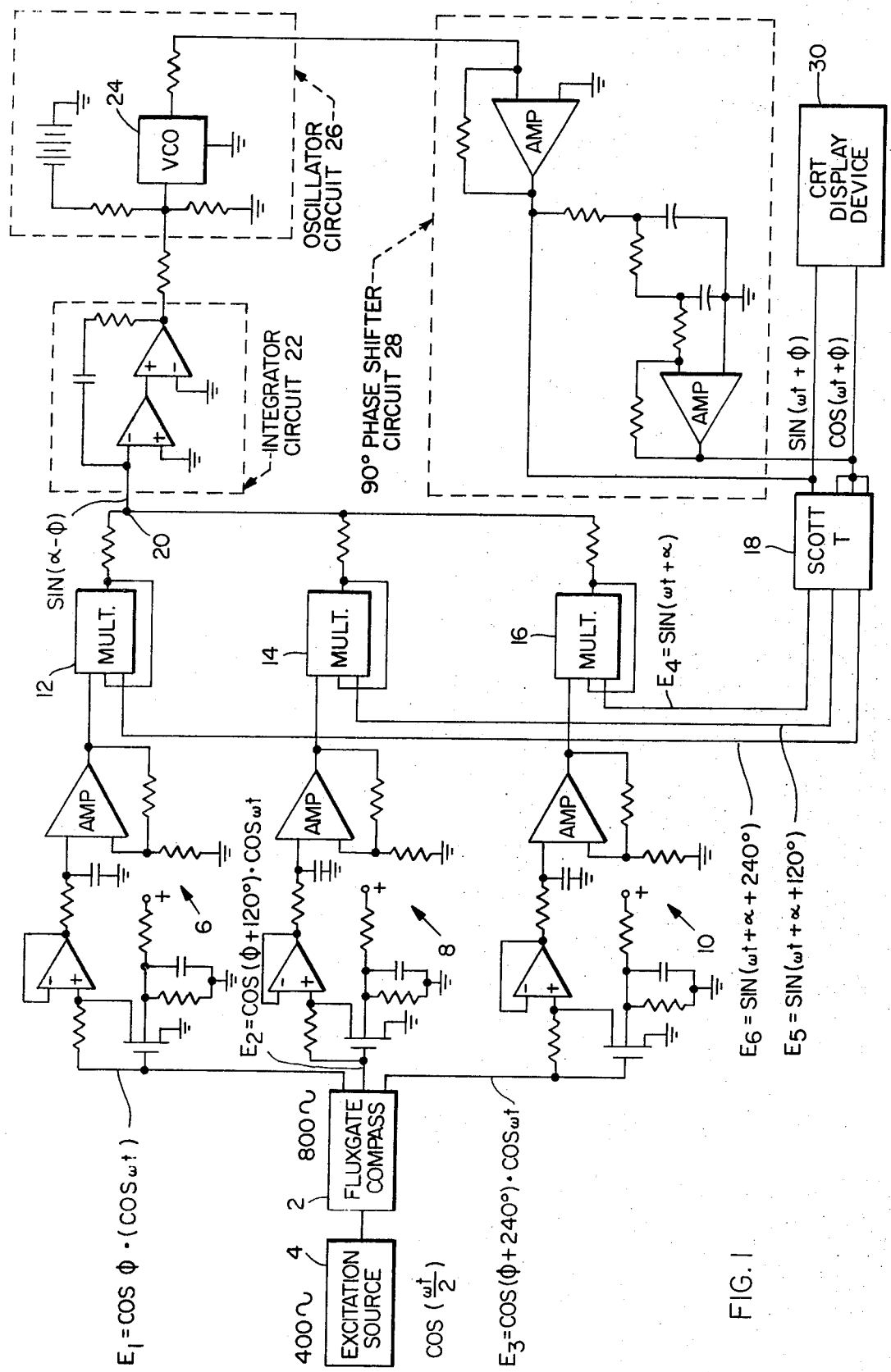
FIG. 1 is an electrical schematic diagram of the basic compass follower of the invention.

FIG. 1 shows a flux gate compass 2 excited by a 400 cycle signal $\cos(\omega t/2)$ from an excitation source 4. Flux gate compass 2 is of the conventional type which, when so excited, provides three 800 cycle vector spike signals $E_1 = \cos\Phi \cdot \cos\omega t$, $E_2 = \cos(\Phi + 120°) \cdot \cos\omega t$ and $E_3 = \cos(\Phi + 240°) \cdot \cos\omega t$, where $\Phi$ is the desired compass heading.

Signals $E_1$, $E_2$ and $E_3$ are applied through gating and buffer circuits 6, 8 and 10 to multipliers 12, 14 and 16 respectively. Circuits 6, 8 and 10 effectively provide a filtering action so as to increase the signal to noise ratio of the signals applied to the multipliers. Multipliers 12, 14 and 16 may be of the conventional commercially available integrated circuit type.

A signal converter which is shown as a Scott-T transformer 18 converts two signals, i.e., $\sin(\omega t + \Phi)$ and $\cos(\omega t + \Phi)$, provided as will hereinafter be described, into three output vector signals 120° apart, i.e., $E_4 = \sin(\omega t + \alpha)$, $E_5 = \sin(\omega t + 120°)$ and $E_6 = \sin(\omega t + \alpha + 240°)$. While a Scott-T transformer is shown for purposes of illustration it is to be understood that other devices such as three conventional resistor summing networks which perform the required converting function may be used as well.

Signals $E_4$, $E_5$ and $E_6$ are essentially phase shifted reference signals and are applied to multipliers 12, 14 and 16, respectively. The multipliers multiply the respective signals from gating and buffer circuits 6, 8 and 10 and Scott-T transformer 18. The multiplied signals are summed at a point 20 for providing a d.c. signal $\sin(\alpha - \Phi)$.

Signal $\sin(\alpha - \Phi)$ is applied to an integrator circuit 22 which integrates the signal and the integrated signal is operated on in a phase locked loop including an oscillator circuit 26 having a voltage controlled oscillator 24 and a 90° phase shifting circuit 28. Thus, the integrated signal is operated on so that $\sin(\alpha - \Phi) = 0$ and $\alpha - \Phi = 0°$, with the outputs of the phase locked loop from phase shifting circuit 28 being $\sin(\omega t + \Phi)$ and $\cos(\omega t + \Phi)$. These outputs are applied to Scott-T transformer 18 which performs the signal conversion as heretofore noted and are applied to the horizontal and vertical deflection plates of a CRT in a display device 30.

The aforenoted structural arrangement may be mathematically analyzed. Considering the fact that flux gate compass 2 is excited by signal $\cos(\omega t/2)$ provided by excitation source 4 for providing vector outputs $E_1$, $E_2$ and $E_3$ as heretofore described, the equation for $E_n$ may be expressed as follows:

$$E_n = \cos(\phi + n \cdot 120°) \sum_1^p H_a(p) \cos(p\omega t \theta p)$$

$$+ \sum_1^q H_b(q) \cos(q\omega t + \theta p), \qquad (1)$$

where $\Phi$ is the desired variation from magnetic north as heretofore noted, $H_a$ is the amplitude of the signal carrier term and $H_b$ is the amplitude of the signal common mode term.

The mathematical analysis may be performed in two steps. First, a simplified analysis is considered wherein the compass vectors $E_1$, $E_2$ and $E_3$ are assumed to be single frequency carriers. Thus, with $F_1 = \cos\Phi \cdot \cos\omega t$, $E_2 = \cos(\Phi + 120°) \cdot \cos\omega t$ and $E_3 = \cos(\Phi + 240°) \cdot \cos\omega t$, the sum of the multiplied signals $E_s$ as provided at point 20 is expressed as follows:

$E_s = \cos\Phi \cdot \cos\omega t \cdot \sin(\omega t + \alpha) + \cos(\Phi + 120°) \cos\omega t \cdot \sin(\omega t + 120° + \alpha) + \cos(\Phi + 240°) \cdot \cos\omega t \cdot \sin(\omega t + 240° + \alpha)$, $E_s = \frac{1}{2}\cos\Phi [\sin\alpha\lambda + \sin(2\omega t + \alpha)] + \frac{1}{2}\cos(\Phi + 120°) [\sin(\alpha + 120°) + \sin(2\omega t + 120° + \alpha)] + \frac{1}{2}\cos(\Phi \cdot 240°) + [\sin(\alpha + 240°) + \sin(2\omega t + 240° + \alpha)]$  (2)

The $2\omega t$ terms are removed by integrator circuit 22, then:
$E_s = \frac{1}{2}\cos\Phi \cdot \sin\alpha + \frac{1}{2}\cos(\Phi + 120°) \cdot \sin(\alpha + 120°) + \frac{1}{2}\cos(\Phi + 240°) \cdot \sin(\alpha + 240°)$, $= \frac{3}{4} \sin(\alpha - \Phi) + \frac{1}{4}[\sin(\alpha + 0) + \sin(\alpha + 0 + 240°) + \sin(\alpha + 0) + 120°]$, $= \frac{3}{4}(\alpha - \Phi)$,
and, in the phase locked loop: $\sin(\alpha - \Phi) \gtrless 0$, $\alpha - 0 \gtrless 0$, $\alpha = \Phi$  (3)

The above analysis may be expanded to include the common mode and carrier harmonic terms. Thus, with compass vectors $E_1$, $E_2$ and $E_3$ as previously defined, then:

$E_s = \left[ \cos(\phi + n.120°) \sum_1^p H_a(p) \cos(p\omega t + \theta p) \right.$ $\left. + \sum_1^{\emptyset} H_b(q) \cos(q\omega t + \theta p) \right] \cdot \sin(\omega t + \alpha + n.120°)$, $E_s = 1/2[\sin(\omega t) + \alpha + \phi + 2n.120°) + \sin(\omega t + \alpha - \phi)]$.

$\sum_1^p H_a(p) \cos(p\omega t + \theta p) + \sin(\omega t + \alpha + n.120°)$.

$\Sigma H_b(q) \cos(q\omega t + \theta p)$, $E_s = 1/4 \sum_1^p H_a(p) \left[ \sin\{(1+p)\omega t + \alpha + \phi + 2.n.120° + \theta p\} + \sin\{(1-p)\omega t + \alpha + \phi + 2n.120° - \theta p\} + \sin\{(1+p)\omega t + \alpha - \phi + \theta p\} + \sin\{(1-p)\omega t + \alpha - \phi - \theta p\} \right.$ $\left. + 1/2 \sum_1^{\emptyset} H_b(q) \sin\{(1+q)\omega t + \alpha + n.120° + \theta q\} \right.$ $\left. + \sin\{(1-q)\omega t + \alpha.n + 120° - \theta q\} \right]$  (4)

Summing over $n$, and using $p=1$ and the phase locked loop $\alpha = \Phi + \theta_1$, and substituting this value in equation (4), the following results:

$E_s = 1/4 \sum_1^p H_a(p) \left[ \sin\{(1+p)\omega t + 2\phi + \theta_1 + \theta_p 2n.120°\} \right.$ $+ \sin\{(1-p)\omega t + 2\phi + \theta_1 - \theta_p + 2n.120°\}$ $+ \sin\{(1+p)\omega t + \theta_1 + \theta_p\} + \sin\{(1-p)t + \theta_1 - \theta_p\}$ $\left. + 1/2 \sum_1^{\emptyset} \overline{H_b(q)} \sin\{(1+q)t + \phi + \theta_1 + \theta_q\} + n.120° \right.$ $\left. + \sin\{(1-q)t + \phi + \theta_1 - \theta_q + n.120°\} \right]$  (5)

Summing equation (5) over $n$ gives the following:

$1/4 \sum_1^p H_a(p)[\sin\{(1+p)\omega t + \theta_1 + \theta_p\}$ $+ \sin\{(1-p)\omega t + \theta_1 - \theta_p\}]$,  (6)

which is the residual term. The first two terms for this summation are:
$\frac{1}{4} H(1) \sin(2\omega t + 2\theta_1) + \frac{1}{4} H(2) [\sin(3\omega t + \theta_1 + \theta_2) + \sin(\omega t + \theta_1 - \theta_2)]$,  (7)

It should be noted that $\theta_2 \approx 2\theta_1$ and the fundamental term can thus be used for the correction of loop errors.

In the previous analysis it is shown that the basic correlator loop nulls to $(\Phi + \theta_1)$ where $\Phi$ is the compass heading and $\theta_1$ is the phase delay of the 800 cycle component of the compass output. It should be emphasized that $\theta_1$ is a function of compass excitation voltage. Accordingly, it is desired to remove the effect of $\theta_1$ from the compass follower output.

Figure 2:
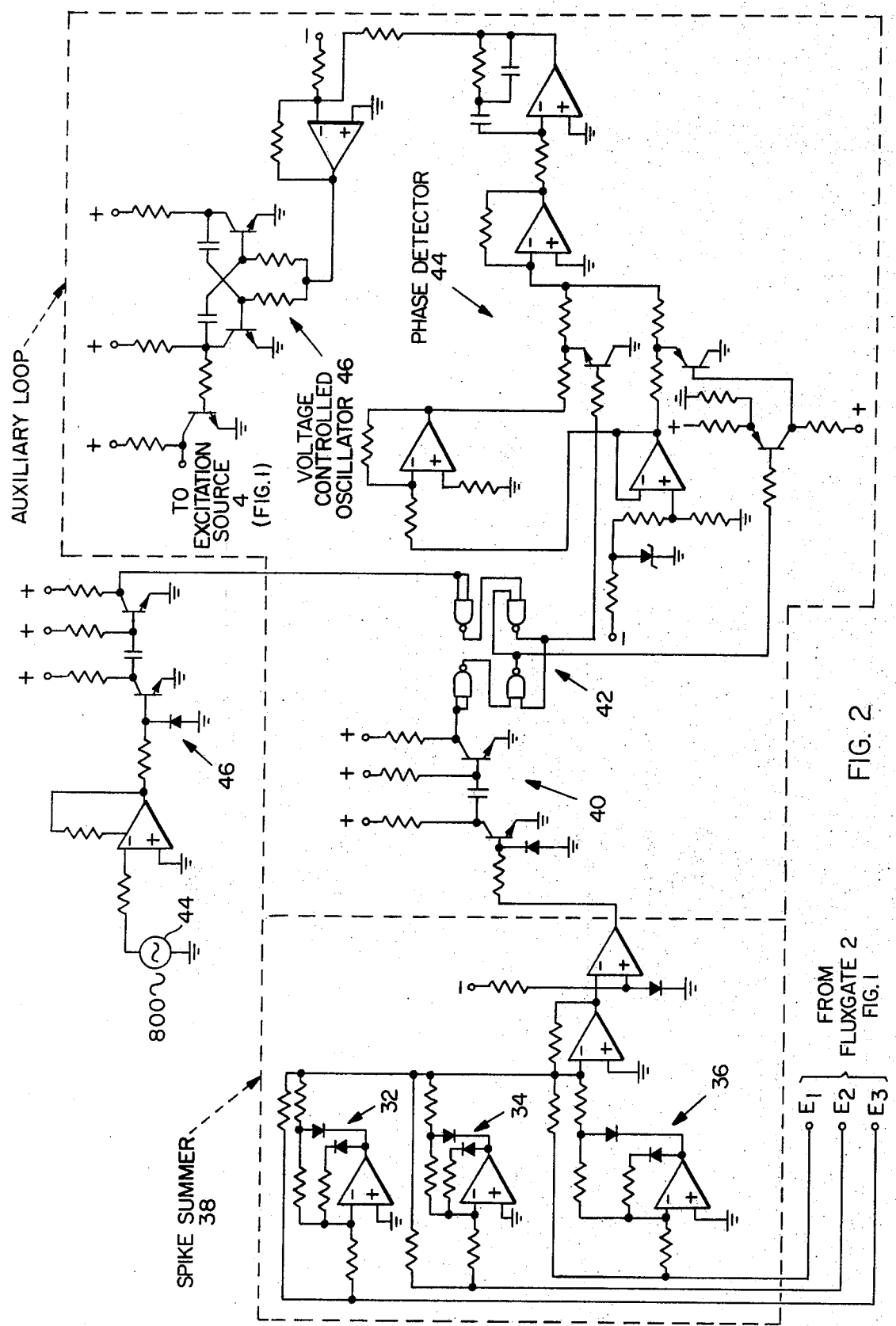
FIG. 2 is an electrical schematic diagram showing an embodiment of the invention including an auxiliary loop whereby the compass follower output is rendered independent of compass excitation.

The implementation for accomplishing this purpose is shown in FIG. 2, and wherein an auxiliary loop in which the compass drive is phase locked to some external reference is provided.

Thus, with reference to FIG. 2, vector spikes $E_1$, $E_2$ and $E_3$ are applied to input circuits 32, 34, and 36 in a spike summer 38. Spike summer 38 sums the absolute value of the compass vectors to form a single large spike. It is this spike that is phase locked to the external reference.

In accordance with the above, the spike from spike summer 38 is applied to a threshold circuit 40 which detects the peak of the spike, and therefrom to a gating circuit 42. An 800 cycle external reference signal from a reference signal source 44 is applied through an input circuit 46 to gating circuit 42. With this structure, the spike peak, as detected by threshold circuit 40, forms a time reference which times the beginning of the 800 cycle external signal from signal source 44.

A phase detector 44 detects the phase of the 800 cycle external signal and provides a corresponding output signal which is in effect a phase error signal. The phase error signal is applied to a voltage controlled oscillator 46, which may be of the type shown in FIG. 2 or may be of a conventional type such as the device shown generally in FIG. 1 and designated by the numeral 26. Voltage controlled oscillator 46 provides an oscillating signal having a magnitude proportional to the error signal from phase detector 44, and which oscillating signal is applied to compass excitation source 4 (FIG. 1) for forcing the compass spikes into phase lock with the external 800 cycle reference signal from signal source 44. In other words, the output from voltage controlled oscillator 46 changes the frequency of the compass excitation which appears as a phase difference. This then changes the frequency of the compass output spikes which in turn create the time reference.

The net effect of the aforenoted implementation is that compass 2 is driven by a signal whose relative phase is $-\theta_1$, the compass output has zero degrees relative phase and the compass follower nulls to $\Phi$ rather than to $(\Phi + \theta_1)$ for rendering the compass follower output independent of $\theta_1$.

From the aforenoted description of the invention it will be seen that the objects hereunto set forth have been met. A compass follower has been provided wherein the compass outputs are correlated with a reference signal and the correlated output is operated on in a phase locked loop. An auxiliary loop is provided which phase locks the compass follower output to an external reference for rendering said output independent of compass excitation. The aforenoted may be achieved with solid state implementation thereby increasing reliability and eliminating costly and bulky electromechanical equipment which has heretofore been used for the purposes intended.

While one embodiment of the invention has been illustrated and described in detail, it is to be expressly understood that the invention is not limited thereto. Various changes may be made in the design and arrangement of the parts without departing from the spirit and scope of the invention as the same will now be understood by those skilled in the art.

What is claimed is:

1. For use with a signal device responsive to a condition and energized by an alternating signal from an energizing signal source for providing alternating vector signals corresponding to the condition and at a multiple of the energizing signal frequency, the improvement comprising:

means for combining the alternating vector signals with phase shifted reference signals and for providing a combined output; and a phase locked loop for operating on the combined output, with the phase angle of the loop output corresponding to a variation of the condition from a reference; and an auxiliary loop wherein the alternating vector signals are summed and the summed signal is phase locked to an alternating reference signal to render the phase locked loop output independent of the alternating signal from the energizing signal source.

2. A device as described by claim 1 wherein the means for combining the alternating vector signals with phase shifted reference signals and for providing a combined output includes:

means connected to the phase locked loop and responsive to the output therefrom for providing the phase shifted reference signals as alternating vector signals;

means for multiplying alternating vector signals from the signal device with corresponding reference alternating vector signals; and means for summing the multiplied signals to provide the combined output.

3. A device as described by claim 2, including:

gating means for gating the alternating vector signals from the signal device to the multiplying means to increase the signal to noise ratio of the signals multiplied with the reference alternating vector signals.

4. A device as described by claim 1, wherein the auxiliary loop includes:

means for providing a time reference for the alternating reference signal;

means for detecting the phase of the alternating reference signal relative to the time reference and for providing a phase error signal;

means for providing an alternating signal corresponding to the phase error signal; and said last mentioned signal being connected to the energizing signal source for forcing the alternating vector signals from the signal source into phase-lock with the alternating reference signal.

5. A device as described by claim 4, wherein the means for providing a time reference for the alternating reference signal includes:

means for detecting the peak of the summed signal; and means for gating the alternating reference signal at the detected peak.

* * * * *